May 12, 1925.  
H. F. LEUCK  
1,537,838  
CUSHIONING DEVICE FOR CUTTER BARS  
Filed Jan. 13, 1925   2 Sheets-Sheet 1
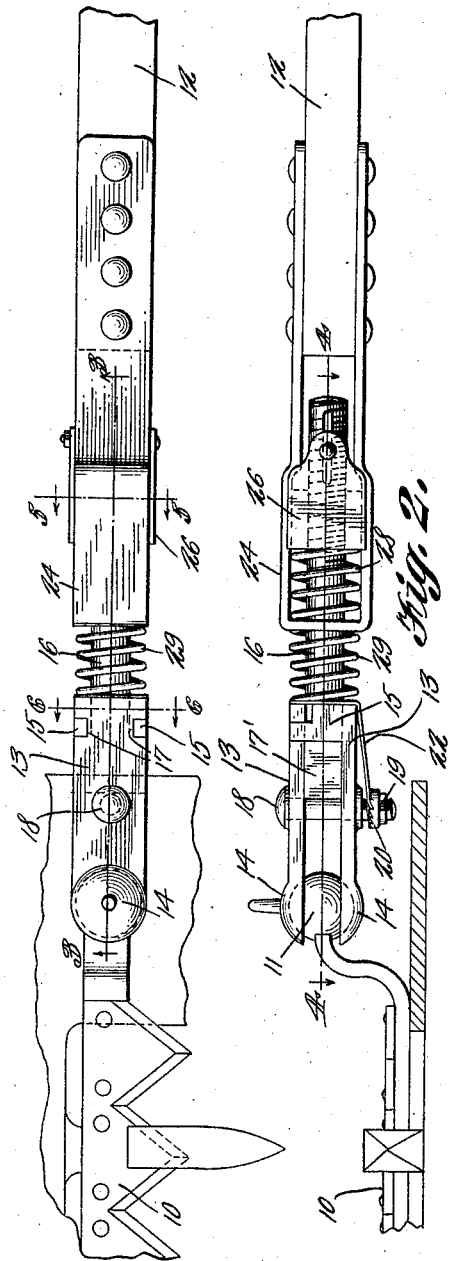
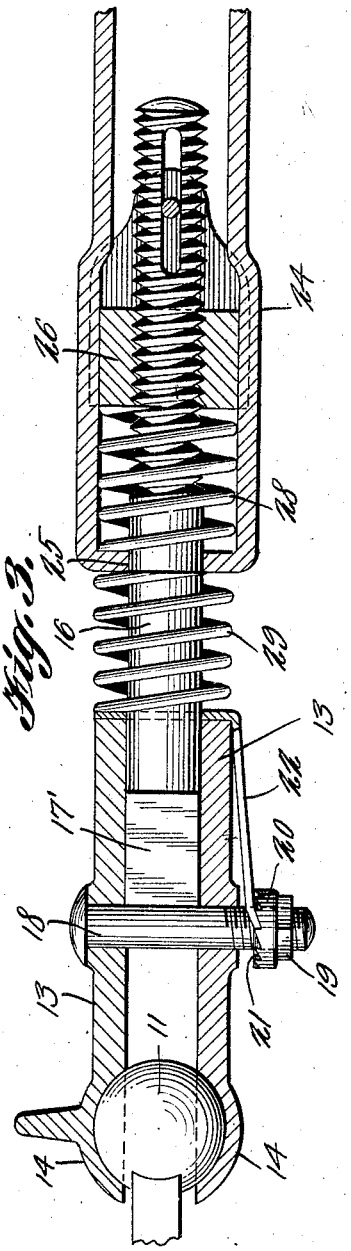
H.F.Leuck,
INVENTOR
BY Victor J. Evans
ATTORNEY
WITNESS:

May 12, 1925.
H. F. LEUCK
1,537,838
CUSHIONING DEVICE FOR CUTTER BARS
Filed Jan. 13, 1925
2 Sheets-Sheet 2
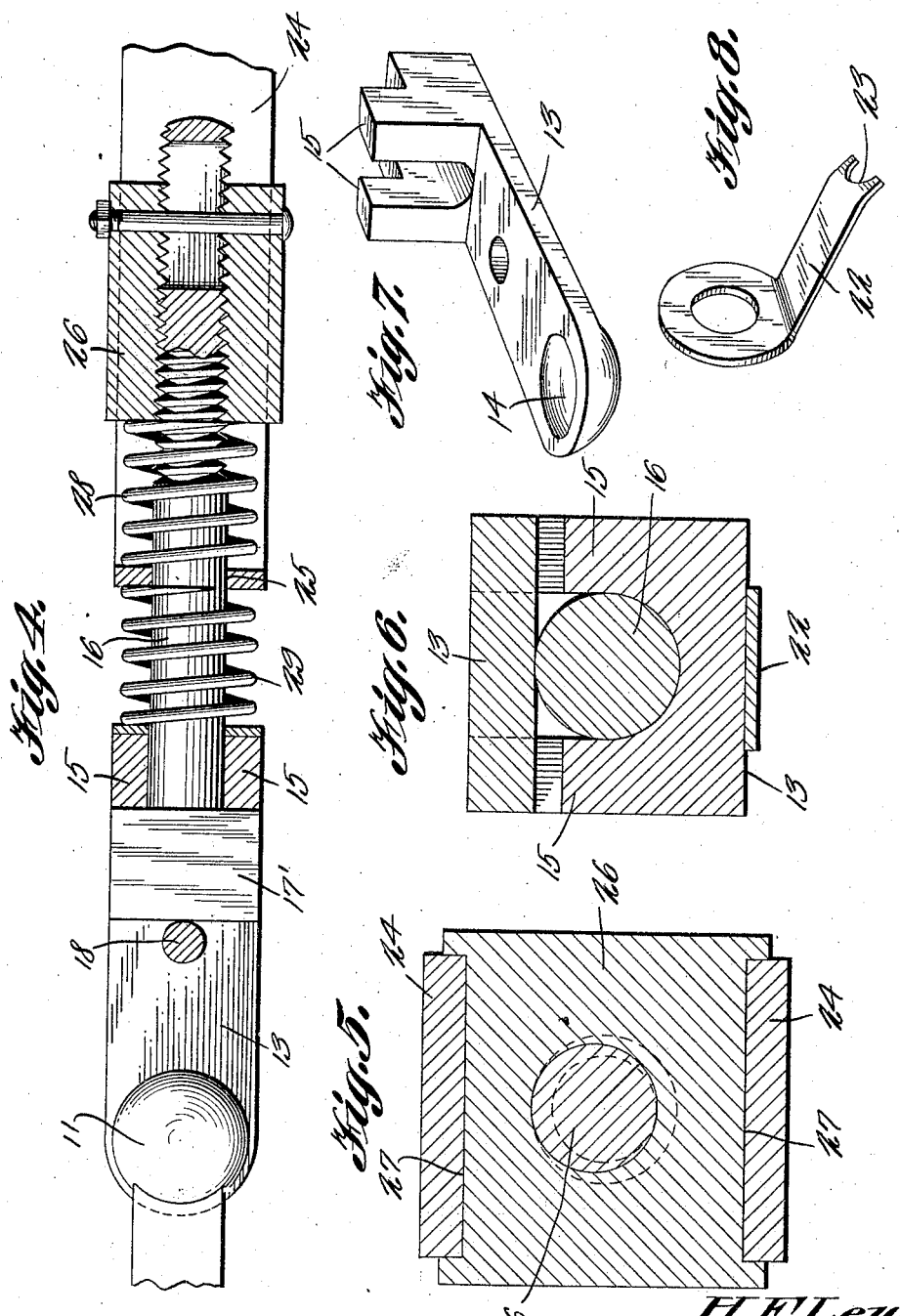

Patented May 12, 1925.

UNITED STATES PATENT OFFICE.

HUBERT F. LEUCK, OF PILGER, NEBRASKA.

CUSHIONING DEVICE FOR CUTTER BARS.

Application filed January 13, 1925. Serial No. 2,194.

*To all whom it may concern:*

Be it known that I, HUBERT F. LEUCK, a citizen of the United States, residing at Pilger, in the county of Stanton and State of Nebraska, have invented new and useful Improvements in Cushioning Devices for Cutter Bars, of which the following is a specification.

This invention relates to pitmen or connecting rods and has for an object the provision of a pitman which includes a yieldable and adjustable section for the purpose of taking up shock and jar incident to the operation of the pitman and for adjusting the yieldable means of the said section to regulate the degree of the yield, as well as to accurately regulate the length of the pitman, the invention being especially adapted for use on mowing machines.

Briefly stated, the primary object of the invention is the provision of means included in pitmen or connecting rods for cutter bars of mowing machines, which will take up shock and jar usually present in the operation of the cutter bar so as to reduce wear upon the operating parts and provide a smooth operating sickle.

With the above and other objects in view, the invention further includes the following novel features and details of construction, to be hereinafter more fully described, illustrated in the accompanying drawings and pointed out in the appended claims.

In the drawings:—

Figure 1 is a plan view of a portion of the sickle of a mowing machine with the invention applied.

Figure 2 is an elevation of the same.

Figure 3 is a section on the line 3—3 of Figure 1.

Figure 4 is a longitudinal sectional view at right angles to Figure 3, the section being taken substantially on the line 4—4 of Figure 2.

Figure 5 is an enlarged transverse section on the line 5—5 of Figure 1.

Figure 6 is a similar view on the line 6—6 of Figure 1.

Figure 7 is a detail perspective view of one of the socketed members of the coupling.

Figure 8 is a similar view of the nut lock for the socketed members.

Referring to the drawings in detail wherein like characters of reference denote corresponding parts, the reference character 10 indicates a portion of the cutter bar of a mowing machine sickle, while 11 indicates the ball member of the ordinary universal coupling usually employed for connecting the end of the pitman or connecting rod 12 to the cutter bar.

As is well known, the pitman is connected to the cutter bar so that the latter will have a reciprocatory movement during the operation of the sickle and ordinarily considerable shock and jar is experienced at each end of the cutter bar stroke so that considerable wear and tear is imparted to the operating parts of the machine.

The shock or jar is eliminated or materially reduced by means of the present invention which provides a yieldable connection between the pitman and cutter bar, and for this purpose the coupling member which engages the ball 11 is of sectional formation and includes a pair of elongated sections 13. The sections 13 are provided at one end and in their opposed faces with sockets 14 for the reception of the ball 11, while at the opposite end of one of these sections is a right angularly disposed U-shaped extension defining spaced lugs 15. These lugs are designed to enter oppositely located notches 17 provided in the other socketed section 13 in which position the sections 13 will be held against relative longitudinal movement. This arrangement also provides an opening for the passage of a bolt 16 having at one end a squared head 17', the inner end of which bears against the adjacent faces of the lugs 15. A bolt 18 connects the sections 13 and serves to hold the latter in proper engagement with the ball 11 and in addition serves to provide a stop for the head 17'.

Mounted upon the bolt 18 is a nut 19 and also mounted upon this bolt between this nut and the adjacent face of one of the sections 13 is a lock washer 20, the opposed faces of the washer and nut being provided with ratchet teeth 21 so as to form an adjustable interlocking engagement. Extending from the lock washer 20 is an arm 22 having a substantially right angled extremity which is provided with a notch 23 for the reception of the bolt 18, so that a lock is provided for the nut 19.

Secured to the end of the pitman rod 12 is a substantially U-shaped yoke 24 having an opening 25 therein for the passage of the bolt 16. The bolt 16 has a threaded engagement with a nut 26 whose opposite side faces are provided with channels 27 for the reception of the yoke 24, so that a sliding engagement between the yoke and nut 26 is provided, but relative rotary movement prevented. Mounted upon the bolt 16 between the nut 26 and the adjacent end of the yoke 24 is a coiled spring 28, a similar spring 29 being mounted upon the bolt 16 between the end of the yoke 24 and the end of the members 13 of the coupling. A yieldable connection between the cutter bar 10 and the pitman rod 12 is thus provided, while by adjusting the bolt 16 within the nut 26 the tension of the springs 28 and 29 may be regulated so as to control the operation of this yieldable connection. This adjustment also provides means whereby the length of the pitman may be accurately regulated.

The invention is susceptible of various changes in its form, proportions and minor details of construction and the right is herein reserved to make such changes as properly fall within the scope of the appended claims.

Having described the invention what is claimed is:—

1. In a pitman, a rod, a coupling member, a yoke secured to one end of the rod and provided with an opening, a coupling member, a bolt having one end engaged in the coupling member and its opposite end extending through the opening of the yoke, a spring surrounding the bolt between the coupling member and yoke, an adjusting nut mounted upon the bolt and slidingly engaging the yoke to prevent relative rotary movement and a spring surrounding the bolt between the end of the yoke and the adjusting nut.

2. In a sickle, the combination with a cutter bar provided with a ball coupling member, a connecting rod, a bolt yieldingly and adjustably secured to said rod and a socketed coupling member carried by the bolt, said bolt carried coupling member comprising a pair of sections arranged in parallel spaced relation and provided with opposed sockets at one of their ends, the opposite end of one of said sections having oppositely located notches therein, right angularly arranged spaced lugs extending from the adjacent end of the other section and receivable in said notches to hold the sections against relative longitudinal movement and providing an opening for the passage of the shank of the above mentioned bolt and holding the latter against movement in one direction, a bolt extending transversely through the socketed sections to hold said sections against relative lateral movement and providing a stop for the head of the first mentioned bolt and means for yieldingly and adjustably securing said first mentioned bolt to the connecting rod.

In testimony whereof I affix my signature.

HUBERT F. LEUCK.